United States Patent
Gannamaneni et al.

(10) Patent No.: US 11,876,368 B2
(45) Date of Patent: Jan. 16, 2024

(54) CONVERTER SYSTEM FOR TRANSFERRING POWER

(71) Applicant: Volvo Car Corporation, Gothenburg (SE)

(72) Inventors: Narendar Rao Gannamaneni, Gothenburg (SE); Ali Dareini, Gothenburg (SE); Arsam Golriz, Gothenburg (SE); Johan Sjöstedt, Gothenburg (SE); Andreas Ådahl, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 145 days.

(21) Appl. No.: 17/540,431

(22) Filed: Dec. 2, 2021

(65) Prior Publication Data
US 2022/0200441 A1    Jun. 23, 2022

(30) Foreign Application Priority Data

Dec. 22, 2020  (EP) .................................... 20216702

(51) Int. Cl.
*H02J 1/00*        (2006.01)
*B60L 53/22*       (2019.01)

(52) U.S. Cl.
CPC .............. *H02J 1/002* (2020.01); *B60L 53/22* (2019.02); *B60L 2210/10* (2013.01)

(58) Field of Classification Search
None
See application file for complete search history.

(56) References Cited

U.S. PATENT DOCUMENTS

| | | | | |
|---|---|---|---|---|
| 2015/0306973 | A1* | 10/2015 | Gunnerud | B60L 53/20 320/162 |
| 2018/0251036 | A1* | 9/2018 | Tapadia | H02P 5/74 |
| 2018/0257494 | A1* | 9/2018 | Yang | H02M 3/1584 |
| 2019/0312449 | A1* | 10/2019 | Matsushita | H02J 1/08 |
| 2020/0247227 | A1* | 8/2020 | Kawamura | H01M 50/249 |

OTHER PUBLICATIONS

Jun. 9, 2021 Extended European Search Report issued in International Application No. 20216702.9.

* cited by examiner

*Primary Examiner* — Jared Fureman
*Assistant Examiner* — Joel Barnett
(74) *Attorney, Agent, or Firm* — Clements Bernard Walker; Christopher L. Bernard

(57) ABSTRACT

A converter system for transferring power, a vehicle including such a converter system and a method for transferring power in such a converter system. The converter system includes a first DC-DC module, a second DC-DC module and a first control unit. The first DC-DC module is connected to a first high voltage interface of a high voltage system and to a first low voltage interface of a low voltage system. The second DC-DC module is connected to a second high voltage interface of the high voltage system and to a second low voltage interface of the low voltage system. The first high voltage interface and the second interface are independent of each other. The first control unit is connected to the first DC-DC module and configured to supply power via the second DC-DC module in case of a failure in the first DC-DC module.

13 Claims, 1 Drawing Sheet

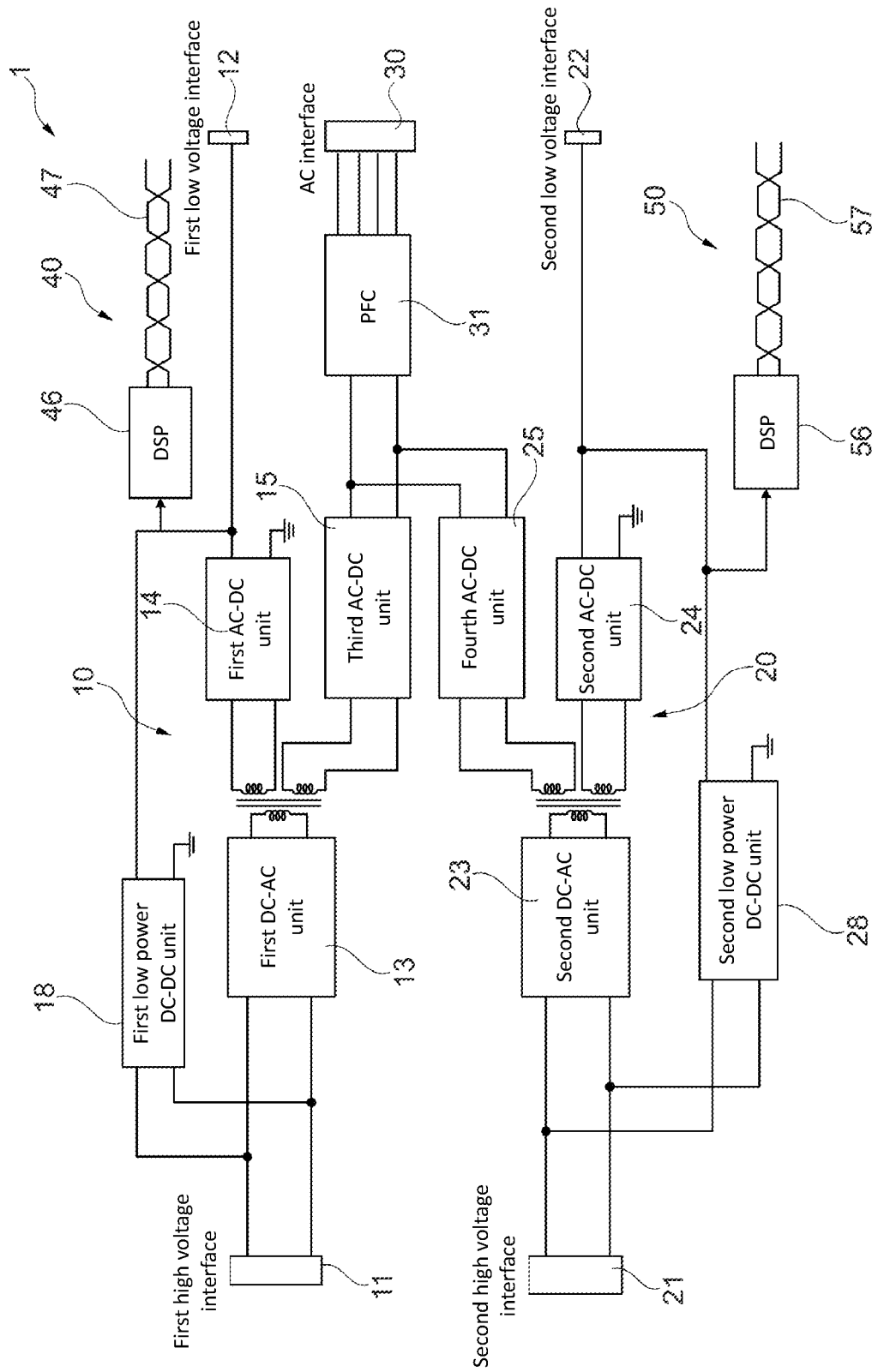

CONVERTER SYSTEM FOR TRANSFERRING POWER

CROSS-REFERENCE TO RELATED APPLICATION

The present disclosure claims the benefit of priority of co-pending European Patent Application No. 20 216 702.9, filed on Dec. 22, 2020, and entitled "CONVERTER SYSTEM FOR TRANSFERRING POWER," the contents of which are incorporated in full by reference herein.

TECHNICAL FIELD

The present disclosure relates to a converter system for transferring power, a vehicle including such a converter system and a method for transferring power in such a converter system.

BACKGROUND ART

In electric vehicles, there are different power conversion modules, which are functional under different scenarios. For example, an on-board charger will convert AC to DC during charging to charge a high voltage battery and a traction inverter will convert DC to AC during driving to drive the vehicle. In both scenarios, either the on-board charger or the traction inverter is functional. However, to maintain a power supply to low voltage system loads, a DC-DC converter, which transfers power from a high voltage system to a low voltage system, must be functional under both scenarios.

The DC-DC converter is more stressed when compared to other power conversion modules. This makes design requirements of the DC-DC converter more complex. If the DC-DC converter fails during driving, some of vehicle functions supplied from the low voltage system could be at risk, particularly when a charge state on a low voltage battery is low. Moreover, the DC-DC converter is turned off when the vehicle is in a key-off state. In conventional electric vehicles, a low voltage control unit relies on a low voltage battery supply. Accordingly, if the vehicle is parked for some months, the low voltage battery will be in deep discharge state and the vehicle may be completely shut down.

SUMMARY

There may be a need to provide an improved converter system, which allows a more reliable low voltage supply.

The problem is solved by the subject matter of the present disclosure. It should be noted that the aspects of the disclosure described in the following apply to the converter system for transferring power, a vehicle including such a converter system and a method for transferring power in such a converter system.

According to the present disclosure, a converter system for transferring power is presented. The converter system includes a first DC-DC module, a second DC-DC module and a first control unit. The first DC-DC module is connected to a first high voltage interface of a high voltage system and to a first low voltage interface of a low voltage system. The second DC-DC module is connected to a second high voltage interface of the high voltage system and to a second low voltage interface of the low voltage system. The first high voltage interface and the second interface are independent of each other. The first control unit is connected to the first DC-DC module and configured to supply power via the second DC-DC module in case of a failure in the first DC-DC module.

The converter system of the present disclosure may reduce a risk of supplying power even though single point failures inside the first DC-DC module and the second DC-DC module. The converter system may still operate even in case of a malfunction of the first DC-DC module and/or second DC-DC module by providing power availability on the low voltage system. Accordingly, the converter system may maintain the battery systems and the power supply more efficiently. Moreover, a high safety integration of the converter system may be achieved.

The first DC-DC module and the second DC-DC module may be configured to supply power from a high voltage system to a low voltage system and/or from the low voltage system to the high voltage system. The high voltage system may provide a voltage of 200V or 400V and the low voltage system may provide a voltage of 12V or 48V. However, an inlet voltage of the high voltage system may vary depending on the configuration of the high voltage system. The first DC-DC module and the second DC-DC module may operate dependently of a load consumption in order to maximize an efficiency of the converter system. In other words, the first DC-DC module and the second DC-DC module may operate alone or together to provide an efficient power supply.

The first high voltage interface and the second high voltage interface may ensure a reliable coupling between the first DC-DC module and the high voltage system and between the second DC-DC module and the high voltage system respectively. The high voltage system may include one battery unit or several battery units. The first high voltage interface and the second high voltage interface may be connected to the same battery unit or to different battery units. The first low voltage interface and the second low voltage interface may ensure a reliable coupling between the first DC-DC module and the low voltage system and between the second DC-DC module and the low voltage system respectively. The first low voltage interface and the second low voltage interface may be also connected to same low voltage system loads or to different low voltage system loads. The low voltage system loads may be control components for opening a door or a window to open, starting the motor, steering and braking loads etc.

The first DC-DC module and the second DC-DC module are connected to each of the high voltage system and the low voltage system independently of each other. In other words, the first high voltage interface and the second high voltage interface operate independently of each other and the first low voltage interface and the second low voltage interface operate independently of each other. The term "independent of each other" may be understood as a structural and/or functional separation of two components. Accordingly, the first high voltage interface and the second high voltage interface may function independently of each other and first low voltage interface and the second low voltage interface may function independently of each other.

The first control unit may include a digital signal processor (DSP) with a dedicated CAN communication interface. The first control unit may be configured to monitor the first DC-DC module and to detect, if the first DC-DC module has a malfunction. The malfunction may occur inside the first DC-DC module and it may be a hardware component failure, a software control failure or a combination of both.

If the first control unit receives any fault signal from the first DC-DC module, the first control unit may separate the connection between the first DC-DC module and the first high voltage interface and/or the connection between the first DC-DC module and the first low voltage interface. At the same time, the first control unit may enable the second DC-DC module to operate or to keep operating to transfer power reliably between the high voltage system and the low voltage system.

In an embodiment, the converter system further includes a second control unit separated from the first control unit. The second control unit is connected to the second DC-DC module and configured to transfer power via the first DC-DC module in case of a failure in the second DC-DC module. The second control unit may include a digital signal processor (DSP) with a dedicated CAN communication interface as well. The second control unit may be configured to monitor the second DC-DC module and to detect, if the second DC-DC module has a malfunction.

If the second control unit receives any fault signal from the second DC-DC module, the second control unit may separate the connection between the second DC-DC module and the second high voltage interface and/or the connection between the second DC-DC module and the second low voltage interface. At the same time, the second control unit may enable the first DC-DC module to operate or to keep operating to transfer power reliably between the high voltage system and the low voltage system. Accordingly, the converter system may ensure a reliable power transfer even though the first DC-DC module or the second DC-DC module would fail.

In an embodiment, the first DC-DC module includes a first AC-DC unit and a first DC-AC unit and the second DC-DC module includes a second AC-DC unit and a second DC-AC unit. Each DC-AC unit is connected to each high voltage interface and each AC-DC unit is connected to each low voltage interface. In other words, the first DC-AC unit may be coupled with the first high voltage interface and the first AC-DC unit may be coupled with the first low voltage interface. Moreover, the second DC-AC unit may be coupled with the second high voltage interface and the second AC-DC unit may be coupled with the second low voltage interface.

The first AC-DC unit and the first DC-AC may allow a power transfer between the high voltage system and the low voltage system via the first DC-DC module. The second AC-DC unit and the second DC-AC may allow a power transfer between the high voltage system and the low voltage system via the second DC-DC module. Accordingly, a separate operating of the first DC-DC module and the second DC-DC module may be ensured.

In an embodiment, the first DC-DC module further includes a third AC-DC unit and the second DC-DC module further includes a fourth AC-DC unit. The third and fourth AC-DC units are connected to an AC interface via a power factor correction (PFC) unit and configured to supply power to the high voltage system and/or to the low voltage system. In other words, each of the first DC-DC module and the second DC-DC may be connected to an on-board charger, which may provide a means to charge a battery system from an external AC power supply.

Accordingly, the power factor correction may be connected to the external AC power supply on one side. The other side of the PFC may be connected to the third AC-DC unit and the fourth AC-DC unit, wherein the third AC-DC unit and the fourth AC-DC unit may operate independently of each other. The PFC may be configured to vary an output voltage in predefined range and provide DC power to the third AC-DC unit and/or the fourth AC-DC unit during a charging process.

Accordingly, the first AC-DC unit may convert the DC power supplied from the third AC-DC unit and/or the second AC-DC unit may convert the DC power supplied from the fourth AC-DC unit to provide power to the low voltage system loads via each low voltage interface. Moreover, the first DC-AC unit may transfer the DC power supplied from the third AC-DC unit to the first high voltage interface and the second DC-AC unit may transfer the DC power supplied from the fourth AC-DC to second high voltage interface. Hence, an independent power transfer during the charging process via the first DC-DC module and the second DC-DC module may be realised, such that even a failure in the first DC-DC module or in the second DC-DC module a reliable power transfer may be ensured.

In an embodiment, the first and the second DC-AC units are configured to supply power from the high voltage system to the low voltage system via the first and second AC-DC units respectively. In other words, the converter system may be configured to transfer power bi-directionally. Accordingly, the first DC-AC unit may transfer power from the first high voltage interface to the first low voltage interface via the first AC-DC unit and the second DC-AC unit may transfer power from the second high voltage interface to the second low voltage interface via the second AC-DC unit. Thus, the high voltage system and the low voltage system may supply power to each other depending on an operating state or a charging state of the respective voltage system to increase an efficiency.

In an embodiment, the first and the second AC-DC units are configured to keep turned-on to supply power to each low voltage interface. In other words, the first AC-DC unit may continuously transfer power to the first low voltage interface and the second AC-DC unit may continuously transfer power to the second low voltage interface. Accordingly, a continuous power supply to the low voltage system via the first low voltage interface or the second low voltage system may be achieved, even though the first DC-DC module or the second DC-DC module would have a failure.

In an embodiment, the first and the second AC-DC units are configured to supply power from the low voltage system to the high voltage system via the first and the second DC-AC units respectively. During an operating process, the first AC-DC unit may transfer power from the first low voltage interface to the first high voltage interface via the first DC-AC unit and the second AC-DC unit may transfer power from the second low voltage interface to the second high voltage interface via the second DC-AC unit. Accordingly, the high voltage system and the low voltage system may supply power to each other depending on an operating state or a charging state of the respective voltage system in increase an efficiency.

In an embodiment, the third and the fourth AC-DC units are configured to supply power from the high voltage system to the AC interface. The AC interface may be further coupled with an electrical grid or any AC loads. The converter system may be configured to enable a reverse power transfer and to supply power from the first and/or second high voltage system to an external system via the first DC-DC module and/or the second DC-DC module. Accordingly, an efficient use of energy may be performed.

In an embodiment, the converter system further includes a first low power DC-DC unit and a second low power DC-DC unit, which are configured to transfer power only in one direction. The first low power DC-DC unit may be connected to the first high voltage interface on one side and to the first low voltage interface on the other side. The second low power DC-DC unit may be connected to the second high voltage interface on one side and the second low voltage interface on the other side. The first low power DC-DC unit and the second low power DC-DC unit may be a low power isolated DC-DC converter.

The first low power DC-DC unit and the second low power DC-DC unit may be configured to transfer power from the high voltage system to the low voltage system. Each of the first low power DC-DC unit and the second low power DC-DC unit may include an analog controller or a digital signal processor to keep supplying power to the low voltage system loads such as opening a door or a window to open, starting the motor etc. Hence, the low voltage system loads may operate also in case of an emergency, in which the first and the second DC-DC modules fail. Accordingly, a high safety integrity level of the converter system may be achieved.

According to the present disclosure, also a vehicle is presented. The vehicle includes a converter system as described above, wherein the vehicle is an electric vehicle. The converter system may allow a power transfer between the high voltage system and the low voltage system even though a failure in the first DC-DC module or in the second DC-DC module occur. The first DC-DC module and the second DC-DC module are connected to each of the high voltage system and the low voltage system independently of each other. Hence, a reliable power supply to the vehicle may be achieved.

In an embodiment, the converter system is configured to operate a first and/or second low power DC-DC unit in a key-off state. The first and/or second low power DC-DC unit may be a low power isolated DC-DC converter, which may be directly connected to the high voltage system and to the low voltage system. The first and/or second low power DC-DC unit may be configured to supply power, particularly to low voltage system loads such as core vehicle control units, opening a window or door.

If the vehicle is for a longer period in a parking mode, the low voltage system may be in a deep discharge state and the vehicle may be completely shut down. The low power isolated DC-DC converter may be turned on in the key off state of the vehicle and supply power to the low voltage system. Accordingly, a pre-defined state of charge of the low voltage system may be maintained and a complete shutdown of the vehicle may be avoided.

In an embodiment, the converter system is configured to transfer power from a third AC-DC unit to a first AC-DC unit and a first DC-AC unit and/or to transfer power from a fourth AC-DC unit to a second AC-DC unit and a second DC-AC unit during a charging mode. If the vehicle is in the charging mode, an on-board charger may transfer power from an AC interface in the direction of the DC-DC modules via a PFC. Accordingly, the third AC-DC unit may supply power to a first low voltage interface via the first AC-DC unit and to a first high voltage interface via the first DC-AC unit. Also, the fourth AC-DC unit may supply power to a second low voltage interface via second AC-DC unit and to a second high voltage interface via the second DC-AC unit.

In an embodiment, the converter system is configured to transfer power from a high voltage system to a low voltage system via the first DC-AC unit and first AC-DC unit and/or the second DC-AC unit and the second AC-DC unit during a driving mode. If the vehicle is in the driving mode, low voltage system loads may be supplied from the high voltage system to the low voltage system via the first DC-AC unit and first AC-DC and/or the second DC-AC unit and the second AC-DC unit. Accordingly, a reliable power supply to the low voltage system loads may be ensured, even though a failure in the first DC-DC module or in the second DC-DC module would occur. Hence, a high safety integrity level of the converter system may be achieved.

According to the present disclosure, also a method for transferring power in a converter system is presented. The method includes the steps of, not necessarily in this order:
  connecting a first DC-DC module to a first high voltage interface of a high voltage system and to a first low voltage interface of a low voltage system,
  connecting a second DC-DC module to a second high voltage interface of the high voltage system and to a second low voltage interface of the low voltage system,
  connecting a first control unit to the first DC-DC module, and
  supplying power via the second DC-DC module in case of a failure in the first DC-DC module,
  the first high voltage interface and the second high voltage interface being independent of each other.

Hence, the converter system may operate even any single point failure of the first or second DC-DC modules. Furthermore, a power supply to the low voltage system may be ensured even though the first DC-DC module and the second DC-DC module are turned off for a longer period.

It should be noted that the above embodiments may be combined with each other irrespective of the aspect involved. Accordingly, the method may be combined with structural features and, likewise, the system may be combined with features described above with regard to the method.

These and other aspects of the present disclosure will become apparent from and elucidated with reference to the embodiments described hereinafter.

BRIEF DESCRIPTION OF DRAWINGS

Exemplary embodiments of the disclosure will be described in the following with reference to the following drawing.

FIG. 1 shows schematically and exemplarily an embodiment of a converter system for transferring power according to the disclosure.

DESCRIPTION OF EMBODIMENTS

FIG. 1 shows a converter system 1 for transferring power. The converter system 1 is configured to transfer power from a high voltage system to a low voltage system or from the low voltage system to the high voltage system. The high voltage system may have a voltage of 200V or 400V and the low voltage system may have a voltage of 12 V or 48V. The converter system 1 may be integrated in an electric vehicle to transfer power.

The converter system 1 includes a first DC-DC module 10 and a second DC-DC module 20. The first DC-DC module 10 includes a first AC-DC unit 14 and a first DC-AC unit 13 and the second DC-DC module 20 includes a second AC-DC unit 24 and a second DC-AC unit 23. The first DC-DC module 10 is connected to a first high voltage interface 11 of a high voltage system via the first DC-AC unit 13 and to a first low voltage interface 12 of a low voltage system via the first AC-DC unit 14. The second DC-DC module 20 is connected to a second high voltage interface 21 of the high voltage system via the DC-AC unit 23 and to a second low voltage interface 22 via the second AC-DC unit 24. The first AC-DC unit 14 and the second AC-DC unit 24 may be configured to keep turned-on to supply power to each low voltage interfaces 12, 22.

The first high voltage interface 11 and the second high voltage interface 21 operate independently of each other and the first low voltage interface 12 and the second low voltage interface 22 operate independently of each other. The high voltage system may include more than one battery unit. The first high voltage interface 11 and the second high voltage interface 21 may be connected to the same battery unit or different battery units. In contrast, the low battery system coupled with the first low voltage interface 12 and the second low voltage interface 22 may the same system, to ensure an operation of low voltage system loads in case of a failure of the first DC-DC module 10 or the second DC-DC module 20.

The first DC-DC module 10 further includes a third AC-DC unit 15 and the second DC-DC module 20 further includes a fourth AC-DC unit 25. The third AC-DC unit 15 and the fourth AC-DC unit 25 are connected to an AC interface 30 via a power factor correction (PFC) 31 unit and they are configured to supply power to the high voltage system and/or to supply power to the low voltage system. In other words, each of the first DC-DC module 10 and the second DC-DC 20 are connected to an on-board charger, which may provide a means to charge a battery system from an external AC power supply. Accordingly, the power factor correction 31 is connected to the AC interface 30 on one side. The other side of the PFC 31 is connected to the third AC-DC unit 15 and the fourth AC-DC unit 25, wherein the third AC-DC unit 15 and the fourth AC-DC unit 25 operate independently of each other.

Thus, the first AC-DC unit 14 converts the DC power supplied from the third AC-DC 15 unit and/or the second AC-DC unit 24 converts the DC power supplied from the fourth AC-DC unit 25 to provide power to the low voltage system loads via each low voltage interface 12, 22. Moreover, the first DC-AC unit 13 transfers the DC power supplied from the third AC-DC unit 15 to the first high voltage interface 11 and the second DC-AC unit 23 transfers the DC power supplied from the fourth AC-DC unit 25 to second high voltage interface 21. Hence, an independent power transfer during a charging process via the first DC-DC module 10 and the second DC-DC module 20 may be realised, such that even a failure in the first DC-DC module 10 or in the second DC-DC module 20 a reliable power transfer may be ensured.

The converter system 1 is further configured to transfer power bi-directionally, from the high voltage system to the low voltage system via the first DC-AC unit 13 and the first AC-DC unit 14 and/or the second DC-AC unit 23 and the second AC-DC unit 24 during a driving mode. The converter system 1 is also configured to supply power from the first high voltage interface 11 to the AC interface 30 via the third AC-DC unit 15 or from the second high voltage interface 21 to the AC interface 30 via the third AC-DC unit 25. The AC interface 30 may be further coupled with an electrical grid or any AC loads.

The converter system 1 further includes a first control unit 40 and a second control unit 50. The first control unit 40 and the second control unit 50 include a digital signal processor (DSP) 46, 56 with a dedicated CAN communication interface 47, 57. The first control unit 40 is connected to the first DC-DC module 10 and configured to supply power via the second DC-DC module 20 in case of a failure in the first DC-DC module 10. The second control unit 50 is separated from the first control unit 10. The second control unit 50 is connected to the second DC-DC module 20 and configured to transfer power via the first DC-DC module 10 in case of a failure in the second DC-DC module 20.

Accordingly, if the first control unit 40 detects a malfunction of the first DC-DC module 10, the first control unit 40 redirects the power supply via the second DC-DC module 50 instead of the first DC-DC module 10. In contrast, if the second control unit 50 detects a malfunction of the second DC-DC module 20, the second control unit 50 redirects the power supply via the first DC-DC module 10 instead of the second DC-DC module 20.

The converter system 1 further includes a first low power DC-DC unit 18 and a second low power DC-DC unit 28. The first low power DC-DC unit 18 is connected to the first high voltage interface 11 on one side and to the first low voltage interface 12 on the other side. The second low power DC-DC unit 28 is connected to the second high voltage interface 21 on one side and to the second low voltage interface 22 on the other side. The first low power DC-DC unit 18 and the second low power DC-DC unit 28 may be a low power isolated DC-DC converter.

The first low power DC-DC unit 18 and the second low power DC-DC units 28 are configured to transfer power only in one direction. Accordingly, the first low power DC-DC unit 18 transfers power from the first high voltage interface 11 to the first low voltage interface 12 and the second low power DC-DC units 28 transfers power from the second high voltage interface 21 to the second low voltage interface 22 to provide power to the low voltage system loads. Hence, the low voltage system loads may operate also in case of an emergency, in which the first and the second DC-DC modules 10, 20 fail. Accordingly, a high safety integrity level of the converter system may be achieved.

It has to be noted that embodiments of the disclosure are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed embodiments. Other variations to the disclosed embodiments can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A converter system for transferring power, comprising:
a first DC-DC module,
a second DC-DC module, and
a first control unit, the first DC-DC module being connected to a first high voltage interface of a high voltage system and to a first low voltage interface of a low voltage system, the first DC-DC module comprising a first AC-DC unit, a first DC-AC unit and a third AC-DC unit, the second DC-DC module being connected to a second high voltage interface of the high voltage system and to a second low voltage interface of the low voltage system, the second DC-DC module comprising a second AC-DC unit, a second DC-AC unit and a fourth AC-DC unit, the first high voltage interface and the second high voltage interface being independent of each other, each DC-AC unit being connected to each high voltage interface, and each AC-DC unit being connected to each low voltage interface, the third and fourth AC-DC units being connected to an AC interface via a power factor correction (PFC) unit and configured to supply power to the high voltage system and/or to supply power to the low voltage system, and the first control unit being connected to the first DC-DC module and configured to supply power via the second DC-DC module in case of a failure in the first DC-DC module.

2. The converter system according to claim 1, the first low voltage interface and the second low voltage interface being independent of each other.

3. The converter system according to claim 1, further comprising a second control unit separated from the first control unit, the second control unit being connected to the second DC-DC module and configured to transfer power via the first DC-DC module in case of a failure in the second DC-DC module.

4. The converter system according to claim 1, the first and the second DC-AC units being configured to supply power from the high voltage system to the low voltage system via first and second AC-DC units respectively.

5. The converter system according to claim 1, the first and the second AC-DC units being configured to keep turned-on to supply power to each low voltage interface.

6. The converter system according to claim 1, the first and the second AC-DC units being configured to supply power from the low voltage system to the high voltage system via the first and the second DC-AC units respectively.

7. The converter system according to claim 1, the third and the fourth AC-DC units being configured to supply power from the high voltage system to the AC interface.

8. The converter system according to claim 1, further comprising a first low power DC-DC unit and a second low power DC-DC unit, the first and second low power DC-DC units being configured to transfer power only in one direction.

9. A vehicle comprising the converter system according to claim 1, the vehicle being an electric vehicle.

10. The vehicle according to claim 9, the converter system being configured to operate a first and/or second low power DC-DC units in a key-off state.

11. The vehicle according to claim 9, the converter system being configured to transfer power from a third AC-DC unit to a first AC-DC unit and a first DC-AC unit and/or to transfer power from a fourth AC-DC unit to a second AC-DC unit and a second DC-AC unit during a charging mode.

12. The vehicle according to claim 11, the converter system being configured to transfer power from a high voltage system to a low voltage system via the first DC-AC unit and first AC-DC unit and/or the second DC-AC unit and the second AC-DC unit during a driving mode.

13. A method for transferring power in a converter system, comprising the following steps:

connecting a first DC-DC module to a first high voltage interface of a high voltage system and to a first low voltage interface of a low voltage system, the first DC-DC module comprising a first AC-DC unit, a first DC-AC unit and a third AC-DC unit, connecting a second DC-DC module to a second high voltage interface of the high voltage system and to a second low voltage interface of the low voltage system, the second DC-DC module comprising a second AC-DC unit, a second DC-AC unit and a fourth AC-DC unit, connecting each DC-AC unit to each high voltage interface, and each AC-DC unit to each low voltage interface, connecting the third and fourth AC-DC units to an AC interface via a power factor correction (PFC) unit, the third and fourth AC-DC units being configured to supply power to the high voltage system and/or to supply power to the low voltage system, and supply power from the high voltage system to the AC interface, connecting a first control unit to the first DC-DC module, and supplying power via the second DC-DC module in case of a failure in the first DC-DC module, the first high voltage interface and the second high voltage interface being independent of each other.

* * * * *